United States Patent [19]

Nagai

[11] Patent Number: 5,557,727
[45] Date of Patent: Sep. 17, 1996

[54] DIAGRAM DRAWING APPARATUS

[75] Inventor: Sachiko Nagai, Fussa, Japan

[73] Assignee: Casio Computer Co., Ltd., Tokyo, Japan

[21] Appl. No.: 24,419

[22] Filed: Mar. 1, 1993

[30] Foreign Application Priority Data

Mar. 2, 1992 [JP] Japan ..................... 4-044889

[51] Int. Cl.⁶ ..................................... G06F 3/14
[52] U.S. Cl. .......................... 395/155; 395/161
[58] Field of Search ..................... 395/155, 135, 395/140, 500, 161; 358/537; 364/419.01

[56] References Cited

U.S. PATENT DOCUMENTS

| | | | |
|---|---|---|---|
| 4,760,458 | 7/1988 | Watanabe et al. | 358/537 |
| 4,847,788 | 7/1989 | Shimada | 395/135 |
| 4,868,785 | 9/1989 | Jordan et al. | 395/140 |
| 5,155,836 | 10/1992 | Jordan et al. | 395/500 |
| 5,317,508 | 5/1994 | Okamoto et al. | 364/419.01 |
| 5,386,507 | 1/1995 | Teig et al. | 395/161 |

FOREIGN PATENT DOCUMENTS

| | | |
|---|---|---|
| 0255765A1 | 2/1988 | European Pat. Off. . |
| 0461830A3 | 12/1991 | European Pat. Off. . |

OTHER PUBLICATIONS

Systems & Computers in Japan, vol. 18, No. 11, Nov. 1987, New York US, pp. 21–32, XP 000006624, Yasuo Ariki et al., "High–Speed Transformation of Drawing Images Based on Structure Description".

*Primary Examiner*—Mark R. Powell
*Assistant Examiner*—Ruay Ho Lian
*Attorney, Agent, or Firm*—Frishauf, Holtz, Goodman, Langer & Chick

[57] ABSTRACT

In a diagram drawing apparatus when a figure in the diagram is enlarged or reduced, data at a line having one end tangent to the figure is automatically modified according to the enlargement or reduction of the figure. When a figure, for example, a rectangle of a flowchart representing a processing step, to which a straight line indicative of a flow of the flowchart is connected, is enlarged, data denoting the line end coordinates (end point coordinates) of the straight line tangent to the rectangle and the other line end coordinates (start point coordinates) of the straight line are read out from a diagram data memory and then stored in a data memory. After that, coordinates of an intersection point between the enlarged rectangle and the straight line are calculated and stored in the data memory. The end point coordinates of the straight line stored in the diagram data memory are changed so as to coincide with the intersection point coordinates, thereby drawing a new straight line connected to the changed start point coordinates in the enlarged rectangle.

8 Claims, 9 Drawing Sheets

DIAGRAM DRAWING APPARATUS

BACKGROUND OF THE INVENTION

1. Field of the Invention

The present invention relates to a diagram drawing apparatus for drawing a diagram including a straight line, a rectangle, a circle, an arc, etc. and, more particularly, to a diagram drawing apparatus capable of enlarging or reducing a figure without performing any operation of an operator for modifying other figures relating to the enlarged or reduced figure.

2. Description of the Related Art

A diagram drawing apparatus has recently been developed on the basis of a personal computer. When a diagram such as a flowchart is prepared and edited by the diagram drawing apparatus, a specific figure has to be often enlarged or reduced. In such a conventional diagram drawing apparatus, however, a target figure can be enlarged or reduced by editing, but the other figures relating to the target figure remain unchanged.

The conventional diagram drawing apparatus will be described more specifically, with reference to FIGS. 9A to 9C showing a process of enlarging a figure of a flowchart. As shown in FIG. 9A, a diagram of the flowchart including a rectangle A, straight lines B and C whose ends are tangent to the rectangle A, and a figure D for a starting step, is prepared. When the rectangle A is enlarged to a range indicated by a broken line A' as shown in FIG. 9B, none of the other figures B–D change. In other words, the straight lines B and C remain unchanged. Therefore, as shown in FIG. 9C, the end portions b and c of the straight lines B and C go inside the enlarged rectangle A'. A user has to perform an edit operation to delete the end portions b and c of the straight lines B and C going inside the enlarged rectangle A'. This edit operation is very troublesome and complicated.

SUMMARY OF THE INVENTION

The feature of a diagram drawing apparatus according to the present invention is as follows.

When a figure in a diagram being drawn is enlarged or reduced, diagram data is read out from a diagram data memory section and displayed on a display section. If a target figure of the diagram data displayed on the display section is designated by a designating section, it is enlarged or reduced by an enlargement/reduction section.

A retrieving section retrieves from the diagram data memory section line data denoting a line whose end is tangent to the target figure designated by the designating section, and a line end processor shortens or lengthens the line retrieved by the retrieving section so that the end of the line made is tangent to the target figure enlarged or reduced by the enlargement/reduction section. When the target figure is enlarged, the line is shortened. When the target figure is reduced, the line is lengthened.

Consequently, when a figure is enlarged or reduced, a line whose end is tangent to the figure is automatically shortened or elongated so that the line end comes into contact with the enlarged or reduced figure. It is thus unnecessary to perform any additional operation of modifying the line by an operator in accordance with the enlargement or reduction of the figure.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

Figure 1:
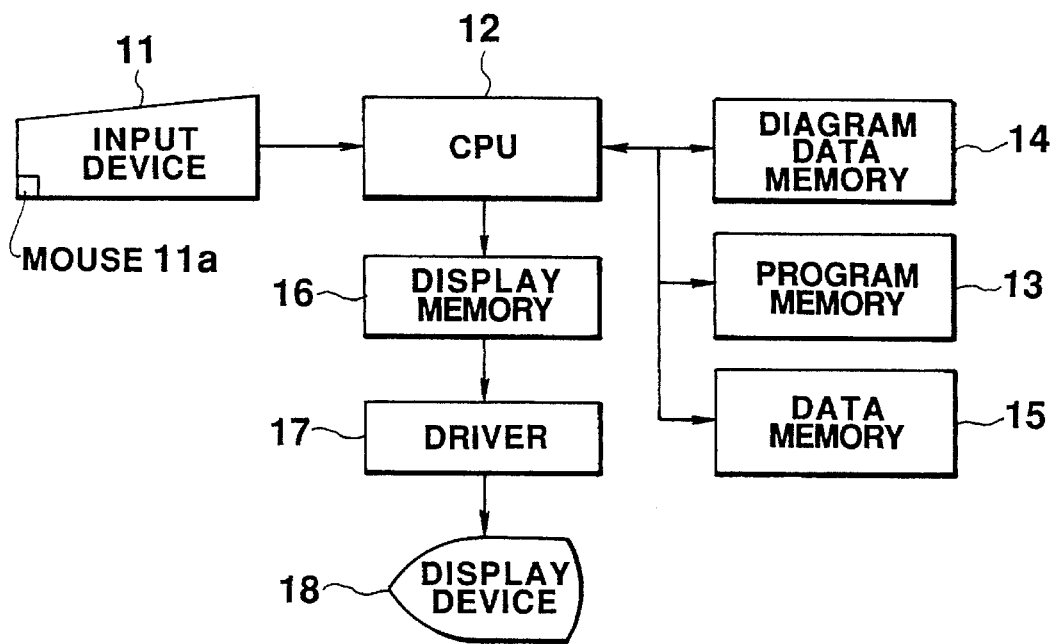
FIG. 1 is a block diagram showing a circuit arrangement of a diagram drawing apparatus according to an embodiment of the present invention.

FIG. 1 is a block diagram showing a circuit arrangement of a diagram drawing apparatus according to an embodiment of the present invention. In the figure, an input device 11 of the diagram drawing apparatus includes a keyboard having function keys such as an execution key and a cursor moving key, and a mouse 11a for moving a mouse cursor to an arbitrary position. Operation signals of the keyboard and mouse are supplied to a CPU 12. The CPU 12 executes various processings such as input control processing and figure edit processing, based on programs stored in advance in a program memory 13. The program memory 13 is constituted by a ROM, a RAM, a magnetic disk apparatus, or the like.

Figure 2:
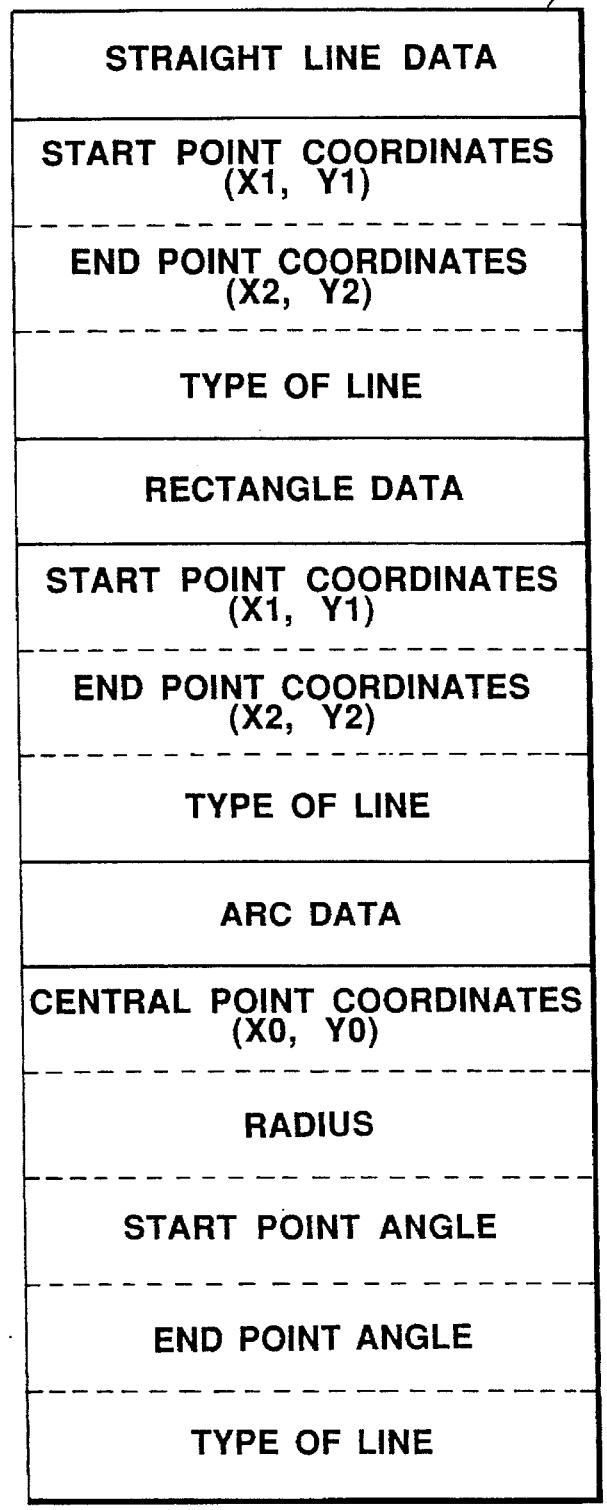
FIG. 2 is a view showing a configuration of a diagram data memory of the diagram drawing apparatus shown in FIG. 1.

A diagram data memory 14 stores a diagram (e.g., drawing of a flowchart) prepared by a user in diagram data form, as shown in FIG. 2. According to the diagram data form, data of a unit figure such as a straight line, a rectangle, and an arc is stored, together with information of coordinates and size of the unit figure, and a type of the line of the unit figure. As shown in FIG. 2, for example, data of the straight line and the rectangle includes coordinates of a start point, those of an end point, a type of a line, etc., and data of the arc includes central coordinates, a radius, angles of the start and end points, a type of the line, etc.

Figure 3:
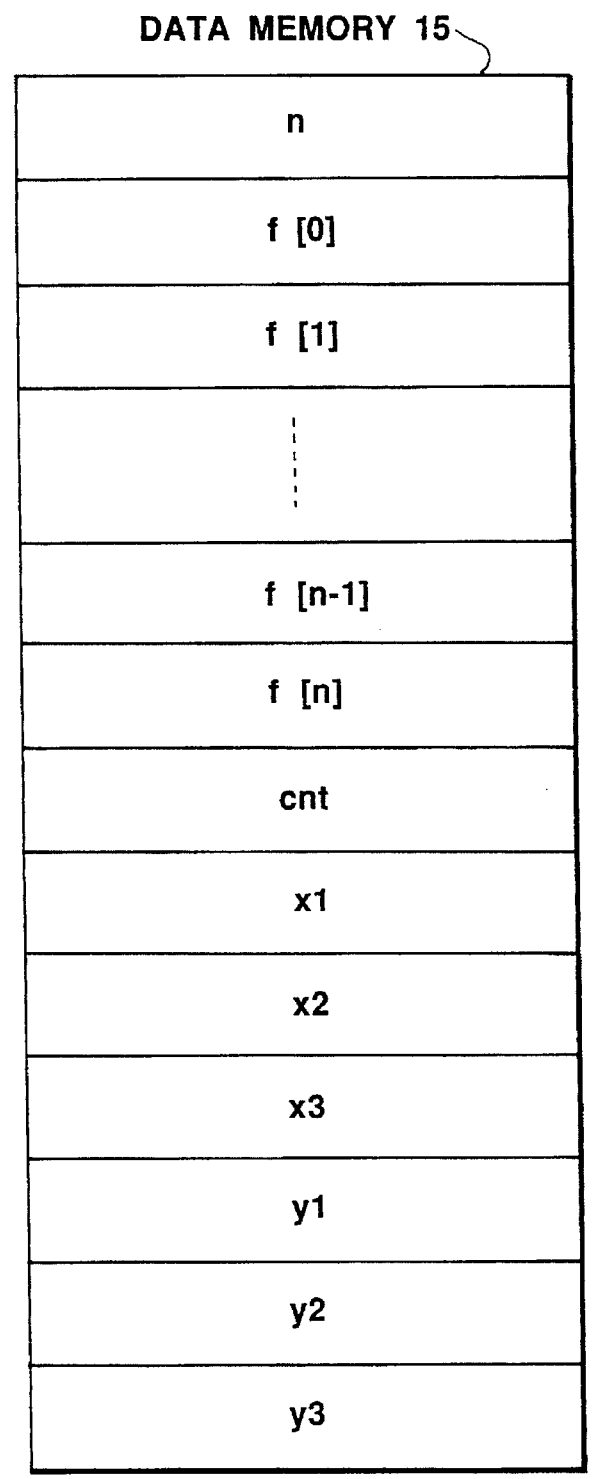
FIG. 3 is a view showing a configuration of a data memory of the diagram drawing apparatus shown in FIG. 1.

A data memory 15 has a plurality of memories necessary for executing various processings. FIG. 3 is a view showing a configuration of the data memory 15. As shown in FIG. 3, memory areas of the data memory 15 are a memory area n for storing the number of figures, memory areas f[0] to f[n] for storing the position of figure data, a memory area cnt for designating the figure data, and memory areas x1 to x3 and y1 to y3 for storing the coordinates of ends of lines.

A display memory 16 stores display data being displayed on a display device 18, as a dot pattern, and converts the diagram data stored in the diagram data memory 14 into figure image data and stores the figure image data. The display data stored in the display memory 16 is displayed on the display device 18 through a driver 17. The display device 18 is constituted by, for example, a CRT display device.

An operation of the diagram drawing apparatus of the embodiment will now be described, with reference to FIGS. 1 to 8.

Figure 4A:
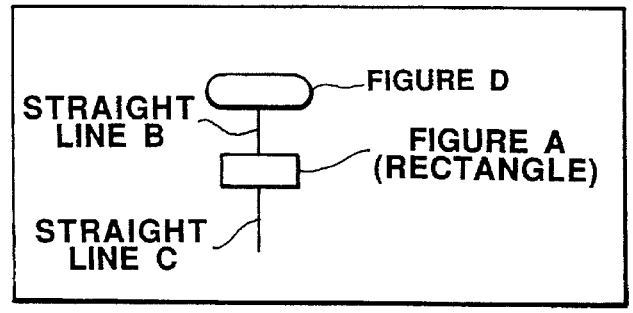
FIGS. 4A to 4C are views showing figure edit displays in the diagram drawing apparatus shown in FIG. 1.

First, an enlargement processing for enlarging a target figure will be described. FIG. 4 shows a figure edit display on which the enlargement processing is executed when a diagram of a flowchart is prepared. FIG. 4A shows the diagram of the flowchart displayed on the display device 18, the diagram being prepared by a user and stored in the diagram data memory 14. The diagram of the flowchart is formed of a figure A of a rectangle which represents a processing step, a straight line B whose one end contacts the upper side of the figure A, a straight line C whose one end is tangent to the lower side of the figure A, and a figure D for a starting step.

Figure 4B:
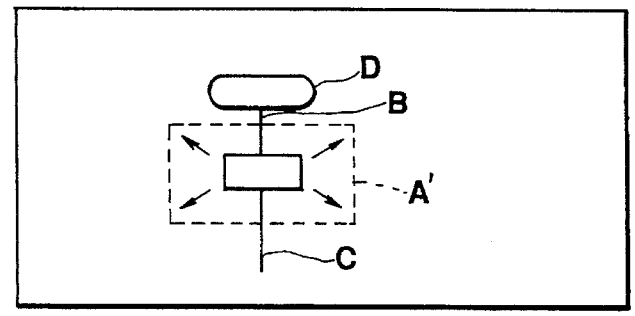

In order to enlarge the figure A to a range A' indicated by a broken line as shown in FIG. 4B, keys of the input device 11 are operated to designate the enlargement processing, then a mouse of the input device 11 is operated to move a mouse cursor to the figure A on the display device, and a click operation is performed to designate the figure A as a target figure F0 for the enlargement processing. After that, the mouse cursor is moved to an intersection point of the diagonals of a rectangle indicated by the broken line to designate a size of the enlarged figure A' and perform a click operation. Thus, the enlargement processing is started.

Figure 5:
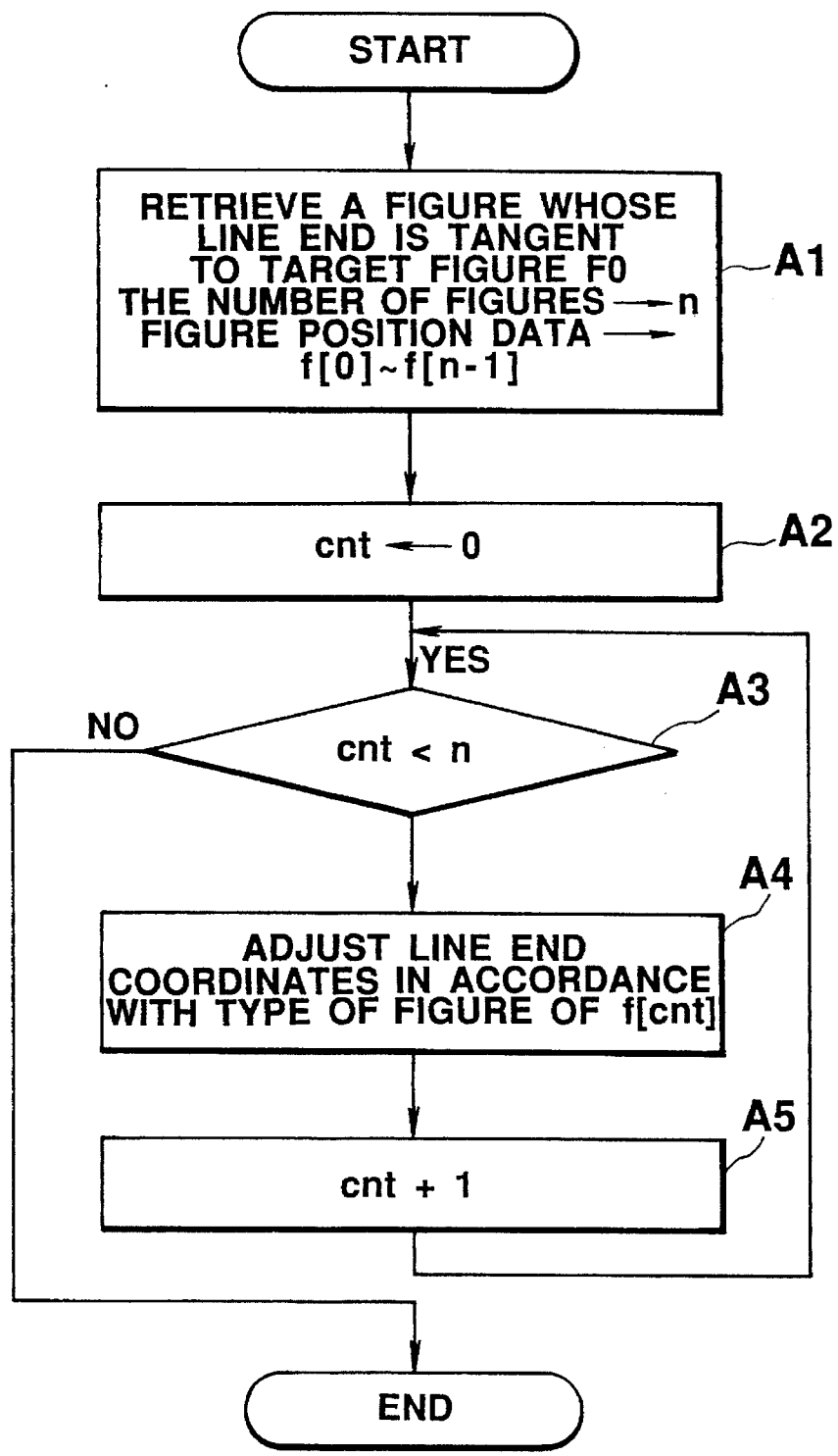
FIG. 5 is a flowchart showing an enlargement/reduction processing of the diagram drawing apparatus shown in FIG. 1.

FIG. 5 shows a flowchart of the enlargement/reduction processing. Needless to say, the enlargement/reduction processing includes an enlargement processing and a reduction processing.

In step A1, a figure (a straight line, an arc, a free line, etc.) an end of which is tangent to the target figure F0 (figure A) is retrieved from diagram data stored in the diagram data memory 14. In this case, the straight lines B and C shown in FIG. 4A are retrieved from the memory 14, and the number "2" of the retrieved figures is stored in the memory area n of the data memory 15. Position data (coordinates of the start and end points, etc.) of the retrieved figures is stored in the memory areas f[0] to f[n−1] of the data memory 15. The memory area f[n] is a memory area designated by the data stored in the memory area n. Since n=2, the position data of the straight lines B and C are stored in the memory areas f[0] and f[1], respectively. Thereafter, the target figure F0 is enlarged with respect to a specified position of the mouse cursor, and figure data representing the enlarged target figure F0' is stored in the diagram data memory 14.

In step A2, "0" is written to the memory area cnt of the data memory 15 to initialize the apparatus.

In step A3, it is determined whether or not contents in the memory area cnt are smaller than contents in the memory area n (cnt<n). If YES (cnt<n), the flow goes to step A4. If NO (cnt≧n), the processing of FIG. 4 is completed. Since cnt=0 and n=2 at the beginning, the flow advances to step A4.

In step A4, the coordinates of the end of a target line are adjusted or changed in accordance with the type of a figure (straight line, arc, free line, etc.) stored in the memory area f[cnt] designated by the information stored in the memory area cnt. More specifically, in this line end coordinates adjustment processing, when the target figure F0 (figure A) is enlarged or reduced to a specified position, the coordinates of the target line are changed with respect to the enlarged or reduced figure, with the result that the target line is shortened or elongated. In the enlargement processing, the coordinates of the end of the line going or projecting inside the enlarged target figure F0' are changed to delete a projected line portion in substance. In the reduction processing, the coordinates of the end of the line which does not reach the resultant reduced target figure F0', are changed to lengthen the line so that the end of the line comes into contact with the reduced target figure F0'.

Since cnt=0, data denoting the straight line B stored in the memory f[0] undergoes the line end coordinates adjustment processing as a target figure data. The line end coordinates adjustment processing differs from figure to figure and, in other words, it varies with the type of a target line such as a straight line, an arc, and a free line.

Figure 6:
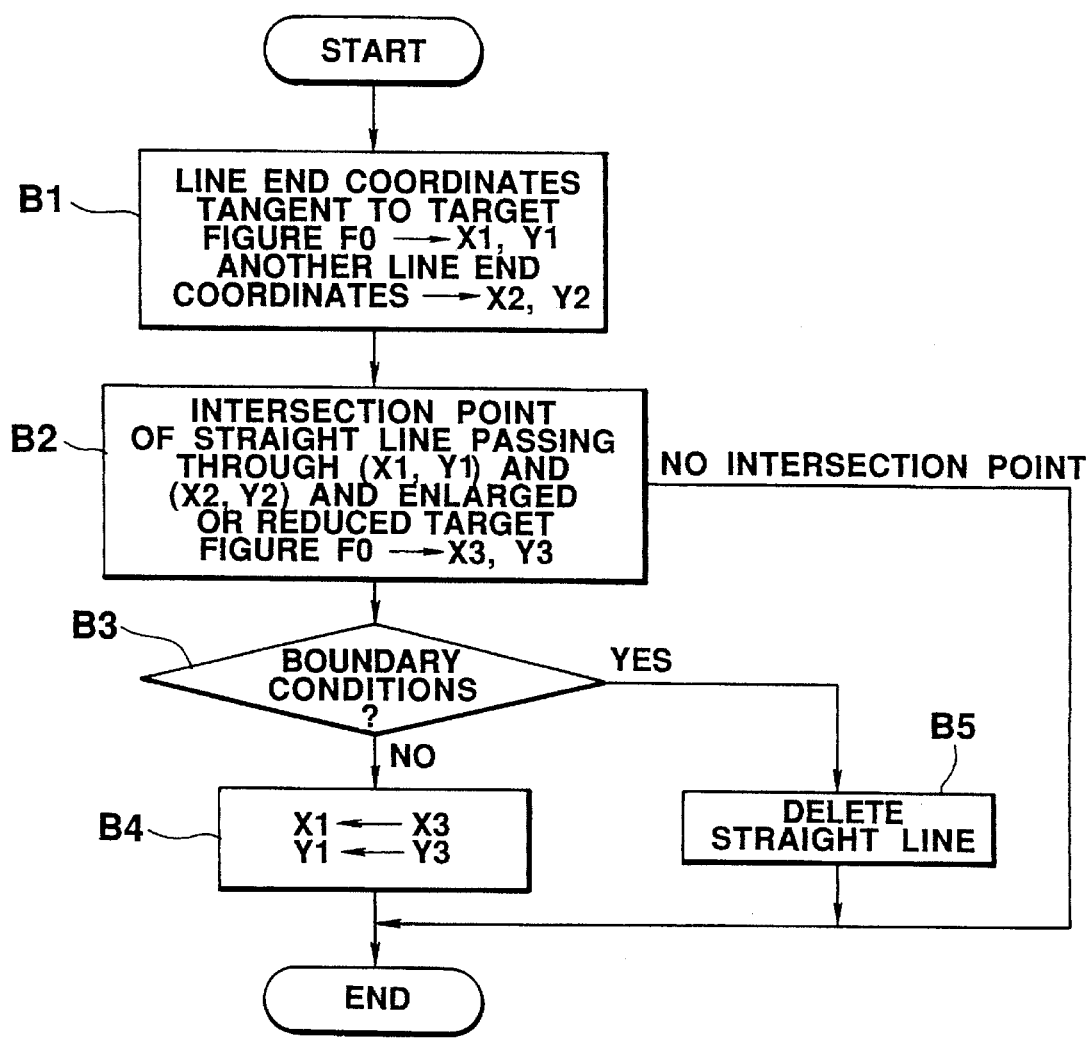
FIG. 6 is a flowchart showing a line end coordinates changing operation of the enlargement/reduction processing shown in FIG. 5.

FIG. 6 is a flowchart showing the line end coordinates adjustment processing A4 for the straight line.

Figure 7:
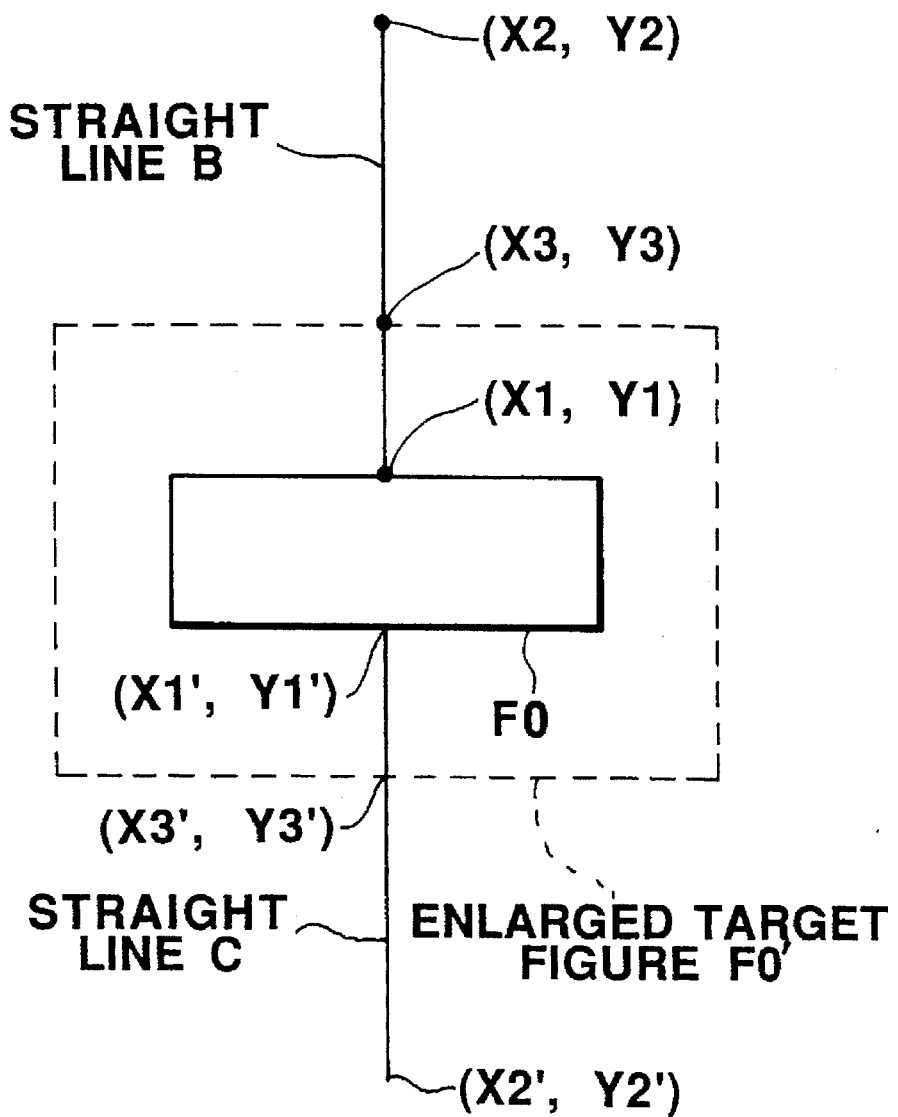
FIG. 7 is a view showing a relationship in coordinates between a figure and its enlarged figure with respect to a connection point between the figures and a line.

In step B1, the coordinates of the end of a target straight line (straight line B) tangent to the target figure F0, are read out from the diagram data memory 14 and then stored in the areas x1 and y1 of the data memory 15. As shown in FIG. 7, the coordinates of the end of the straight line B tangent to the target figure F0, are end point coordinates of the straight line B. The end point coordinates (X1, Y1) are thus read out from the diagram data memory 14 and stored in the areas x1 and y1.

The coordinates of the other end of the straight line B tangent to the figure D, are read out from the diagram data memory 14, and stored in the areas x2 and y2 of the data memory 15. As shown in FIG. 7, the coordinates of the other end of the straight line B are start point coordinates (X2, Y2) of the straight line B. The start point coordinates are therefore read out from the diagram data memory 14 and stored in the areas x2 and y2 of the data memory 15.

In step B2, in case of figure enlargement of FIG. 7, the coordinates (X3, Y3) of an intersection point between the straight line B connecting (X1, Y1) and (X2, Y2) and an enlarged target figure F0', are calculated, and then stored in the areas x3 and y3 of the data memory 15. In the figure reduction case of FIG. 8, the line B is elongated such that an elongated end point coordinates (X3, Y3) tangent to the reduced figure F0' are calculated, and stored in the areas x3 and y3. If there is no intersection or tangent point between the enlarged or reduced figure F0' and the straight line B in step B2, the line end coordinates adjustment processing shown in FIG. 6 is completed. Since there is always an intersection point between them in the enlargement processing, the line end coordinates adjustment processing is not completed.

In step B3, it is determined whether the relationship between the line end coordinates (X1, Y1) and (X2, Y2) and the intersection or tangent point coordinates (X3, Y3) meets the following boundary conditions. The boundary conditions are that, in the enlargement processing of FIG. 7, the line end coordinate X2 is located between the line end coordinate X1 and the intersection point coordinate X3, and the line end coordinate Y2 is located between the line end coordinate Y1 and the intersection point coordinate Y3. In brief, the boundary conditions are that the intersection point coordinates (X3, Y3) of the enlarged figure F0' do not fall within a range of the target straight line B. In FIG. 7, it is checked whether the intersection point coordinate Y3 is larger than the start point coordinate Y2 of the straight line B. The conditions are not applied to the reduction processing since no intersection point can be formed. If YES in step B3, the flow goes to step B5 and, if NO, the flow goes to step B4. In the case of FIG. 7, x1=x2=x3, and the intersection point coordinate Y3 is smaller than the start point coordinate Y2 when the target figure F0 is enlarged as shown by the dashed lines. This case does not meet the boundary condition, and the flow advances to step B4.

In step B4, data of the end point coordinates (X1, Y1) of the target straight line B stored in the diagram data memory 14 is changed to data of the intersection point coordinates (X3, Y3) stored in the areas x3 and y3. More specifically, an end portion of the straight line B between the coordinates (X1, Y1) and (X3, Y3), which goes into the range of the enlarged target figure F0', is deleted, and the start point coordinates of the straight line B are X2 and Y2, and the end point coordinates thereof are X3 and Y3.

If it is determined in step B3 that the above relationship meets the boundary conditions (YES), the straight line B falls within a range of the enlarged target figure F0'. The flow thus advances to step B5, in which the straight line B is completely deleted. More specifically, diagram data of the straight line B stored in the diagram data memory 14 is erased. In other words, diagram data of the start point coordinates (X2, Y2) and the end point coordinates (X1, Y1) is erased.

After the steps B4 and B5 are executed, the line end coordinates adjustment processing is finished, and the flow is returned to the enlargement/reduction processing shown in FIG. 5, in which the step A5 is executed.

In step A5 shown in FIG. 5, the content of the memory area cnt is increased by 1 and its value becomes "1", thereby returning to step A3. In step A3, it is determined whether cnt is smaller than n (cnt<n) or not, as described above. Since, in this case, cnt=1 and n=2, it is determined as YES (cnt<n) again in step A3, and the flow advances to step A4. Since, in step A4, cnt=1, the straight line C stored in the memory area f[1] undergoes the line end coordinates adjustment processing shown in FIG. 6, as described above.

In step B1, the line end coordinates of the target straight line (straight line C) tangent to the target figure F0, are read out from the diagram data memory 14, and then stored in the areas x1 and y1 of the data memory 15. Since the line end coordinates of the straight line tangent to the target figure F0 are end point coordinates of the straight line C, the end point coordinates (X1', Y1') of the straight line C are read out from the diagram data memory 14 and stored in the memories x1 and y1. The other line end coordinates of the straight line C, that is, the start point coordinates (X2', Y2') thereof are read out from the diagram data memory 14 and then stored in the areas x2 and y2.

As described above, in step B2, the coordinates (X3', Y3') of an intersection point between the straight line C passing through the line end coordinates (X1', Y1') and (X2', Y2') and an enlarged target figure F0', are calculated and then stored in the areas x3 and y3 of the data memory 15. In step B3, it is determined whether the relationship between the line end coordinates (X1', Y1') and (X2', Y2') and the intersection point coordinates (X3', Y3') meets the foregoing boundary conditions. If, in this case, the intersection point coordinate Y3', is smaller than the start point coordinate Y2' of the straight line C, the above relationship does not meet the boundary conditions, thereby going to step B4.

In step B4, the end point coordinates (X1', Y1') of the straight line C stored in the diagram data memory 14 are changed to the intersection point coordinates (X3', Y3') stored in the areas x3 and y3, and an end portion of the straight line C between the coordinates (X1', Y1') and (X3', Y3'), which goes inside the range of the enlarged target figure F0', is deleted. After the step B4 is executed, the line end coordinates adjustment processing is finished, and the flow advances to step A5, as described above.

Similarly, in step A5, the content of the memory area cnt is increased by 1 and its value becomes "2", thereby returning to step A3. In step A3, it is determined whether cnt is smaller than n (cnt<n) or not, as described above. Since, in this case, cnt=2 and n=2, it is determined as NO in step A3. Diagram data of the enlarged target figure F0' is stored in the diagram data memory 14, and diagram data of the original target figure F0 is erased from the memory 14, thus completing the enlargement processing shown in FIG. 5. Therefore, a new diagram is displayed based on the diagram data of the enlarged target figure F0'.

Figure 4C:
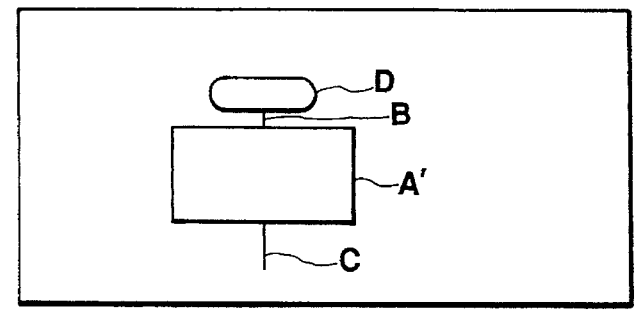
Figure 9A:
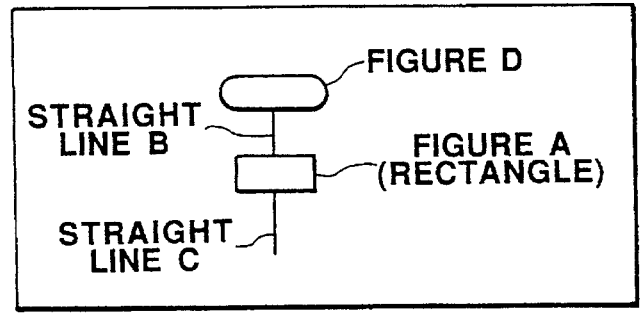
FIGS. 9A to 9C are views showing figure edit displays in a conventional diagram drawing apparatus.
Figure 9B:
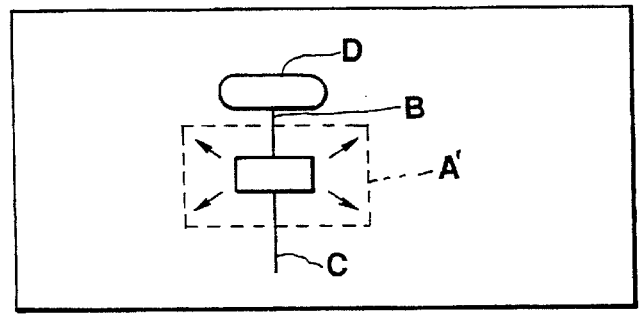
Figure 9C:
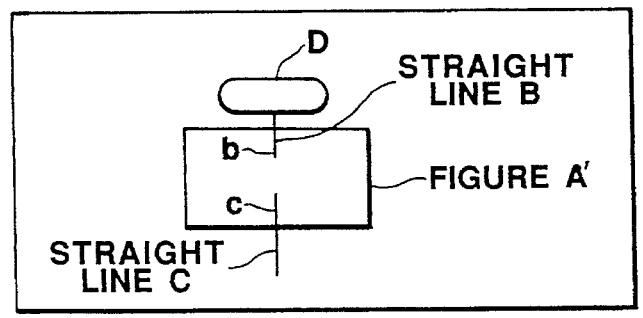

Consequently, when the enlarged figure A' is obtained as shown in FIG. 4C, the end portions b and c of the straight lines B and C as shown in FIG. 9C going inside the enlarged figure A are deleted so that the enlarged figure A' can be put into contact with the ends of the modified straight lines B and C.

Figure 8:
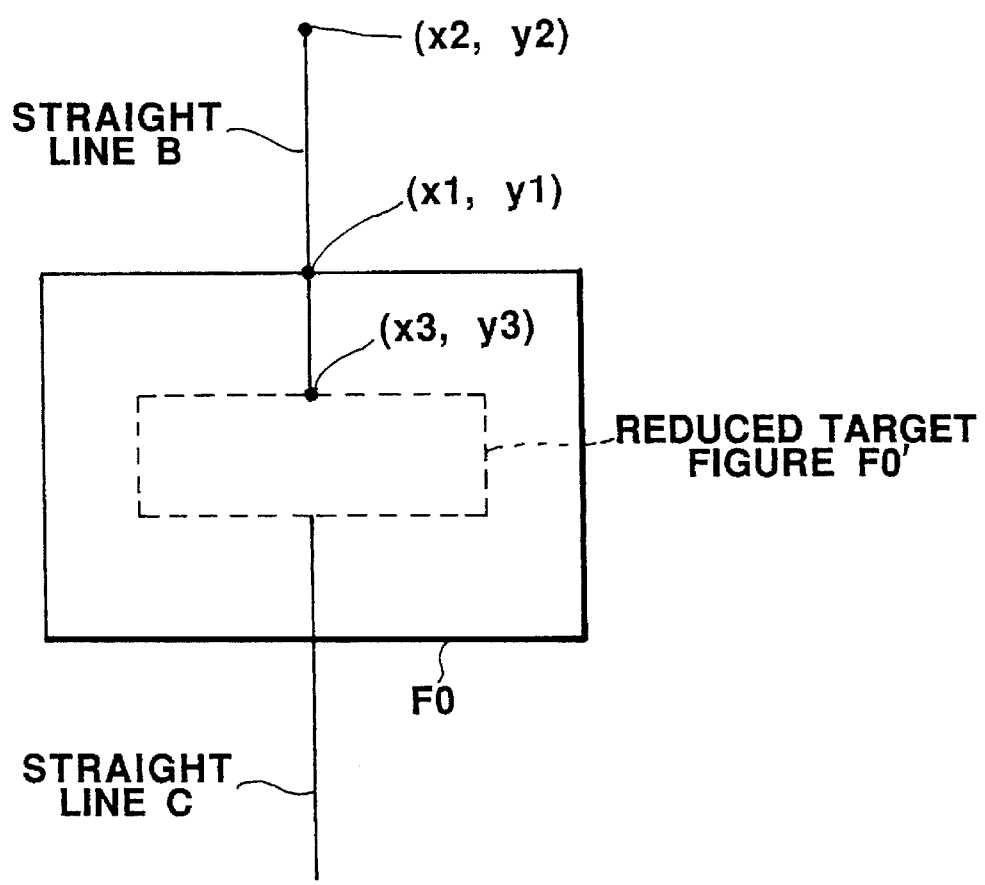
FIG. 8 is a view showing a relationship in coordinates between a figure and its reduced figure with respect to a connection point between the figures and a line.

The reduction processing for a target figure will now be described, with reference to FIG. 8. According to the reduction processing, when the target figure F0 is reduced, the straight lines whose ends are tangent to the target figure F0, are elongated to the reduced figure F0 so that the ends of the lines B and C come into contact with the reduced figure F0'. Therefore, the reduction processing differs from the enlargement processing only in the line end coordinates adjustment processing of step A4 in FIG. 5. The line end coordinates adjustment processing of the reduction processing is as follows. Like in the step B1, the line end coordinates of the target straight line (straight line B) tangent to the target figure F0 are read out from the diagram data memory 14 and then stored in the areas x1 and y1 of the data memory 15. The other line end coordinates of the straight line B, that is, the start point coordinates thereof are read out from the diagram data memory 14 and then stored in the areas x2 and y2 of the data memory 15.

When the straight line B having the line end coordinates (X1, Y1) and (X2, Y2) is lengthened, the coordinates (X3, Y3) of the tangent point of the straight line B and the reduced figure F0' are calculated and stored in the areas x3 and y3 of the data memory 15. After that, the end point coordinates (X1, Y1) of the target straight line B, stored in the diagram data memory 14, are changed to the elongated point coordinates (X3, Y3) stored in the areas x3 and y3. More specifically, if the diagram data is changed, the target straight line B connecting the start point coordinates (X2, Y2) and the end point coordinates (X1, Y1) is elongated so that the end point coordinates are changed to the new point coordinates (X3, Y3). In other words, the target straight line B is elongated so as to come into contact with the reduced target figure F0'. As to the line C, the figure modification process is performed in the similar way.

According to the present invention described above, when a figure is enlarged or reduced, a line whose end is tangent to the figure is automatically shortened or elongated so that the end comes into contact with the enlarged or reduced figure. It is thus unnecessary for a user to perform any additional operation of modifying the line in accordance with the enlargement or reduction of the figure.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A diagram drawing apparatus comprising:

memory means for storing diagram data;

means for displaying the diagram data stored in said memory means;

means for designating a target figure to be enlarged, from the diagram data displayed by said displaying means;

means for automatically retrieving a line whose end is tangent to the target figure designated by said designating means, based on the diagram data stored in said memory means, without requiring any designation of said line by a user;

means for enlarging the target figure as large as a desired magnitude; and means for automatically shortening the line retrieved by said retrieving means in accordance with the target figure enlarged by said enlarging means to connect the end of the line to the enlarged target figure, without user intervention.

2. A diagram drawing apparatus comprising:

memory means for storing diagram data;

means for displaying the diagram data stored in said memory means;

means for designating a target figure to be enlarged, from the diagram data displayed by said displaying means;

means for automatically retrieving a line whose end is tangent to the target figure designated by said designating means, based on the diagram data stored in said memory means, without requiring any designation of said line by a user;

means for enlarging the target figure as large as a desired magnitude; and means for automatically erasing diagram data corresponding to the line retrieved by said retrieving means when both a start point and an end point of the line fall within a range of the target figure enlarged by said enlarging means, without user intervention.

3. The diagram drawing apparatus according to claim 1, wherein said memory means stores diagram data indicative of start point coordinates and end point coordinates for displaying figure data indicative of a straight line, a rectangle and an arc.

4. The diagram drawing apparatus according to claim 2, wherein said memory means stores diagram data indicative of start point coordinates and end point coordinates for displaying figure data indicative of a straight line, a rectangle and an arc.

5. The diagram drawing apparatus according to claim 1, wherein said designating means designates a target figure from the diagram data displayed by said displaying means by using a mouse cursor.

6. The diagram drawing apparatus according to claim 2, wherein said designating means designates a target figure from the diagram data displayed by said displaying means by using a mouse cursor.

7. The diagram drawing apparatus according to claim 1, wherein said retrieving means retrieves from said memory means a line including a straight line, and an elliptical line, whose end is tangent to the target figure designated by said designating means.

8. The diagram drawing apparatus according to claim 2, wherein said retrieving means retrieves from said memory means a line including a straight line, and an elliptical line, whose end is tangent to the target figure designated by said designating means.

* * * * *